United States Patent
Kano et al.

(10) Patent No.: US 10,276,303 B2
(45) Date of Patent: Apr. 30, 2019

(54) DIELECTRIC COMPOSITION AND MULTILAYER ELECTRONIC DEVICE

(71) Applicant: TDK CORPORATION, Tokyo (JP)

(72) Inventors: Yushi Kano, Tokyo (JP); Tsutomu Odashima, Tokyo (JP); Makoto Momota, Tokyo (JP); Hiroshi Sasaki, Tokyo (JP); Masayuki Sato, Tokyo (JP); Toshinari Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/689,393

(22) Filed: Aug. 29, 2017

(65) Prior Publication Data

US 2018/0061572 A1    Mar. 1, 2018

(30) Foreign Application Priority Data

Aug. 30, 2016  (JP) ................................. 2016-168154

(51) Int. Cl.
| | |
|---|---|
| C04B 35/64 | (2006.01) |
| H01G 4/12 | (2006.01) |
| H01G 4/30 | (2006.01) |
| C04B 35/468 | (2006.01) |
| C04B 35/634 | (2006.01) |
| C04B 35/638 | (2006.01) |

(52) U.S. Cl.
CPC ....... *H01G 4/1227* (2013.01); *C04B 35/4682* (2013.01); *C04B 35/638* (2013.01); *C04B 35/6342* (2013.01); *C04B 35/64* (2013.01); *H01G 4/30* (2013.01); *C04B 2235/3206* (2013.01); *C04B 2235/3208* (2013.01); *C04B 2235/3215* (2013.01); *C04B 2235/3225* (2013.01); *C04B 2235/3239* (2013.01); *C04B 2235/3241* (2013.01); *C04B 2235/3418* (2013.01); *C04B 2235/5409* (2013.01); *C04B 2235/6025* (2013.01); *C04B 2235/6562* (2013.01); *C04B 2235/6567* (2013.01); *C04B 2235/6582* (2013.01); *C04B 2235/662* (2013.01); *C04B 2235/80* (2013.01); *C04B 2235/85* (2013.01)

(58) Field of Classification Search
CPC ...... H01G 4/1209; H01G 4/1227; H01G 4/30; C04B 35/468; C04B 35/4682; C04B 35/6261; C04B 35/6264; C04B 35/6342; C04B 35/638; B32B 18/00
See application file for complete search history.

(56) References Cited

U.S. PATENT DOCUMENTS

| | | | |
|---|---|---|---|
| 6,185,087 B1 | 2/2001 | Park et al. | |
| 8,507,395 B2 * | 8/2013 | Murakawa | .......... C04B 35/4682 428/701 |
| 9,922,766 B2 * | 3/2018 | Sato | ..................... H01G 4/1209 |

(Continued)

FOREIGN PATENT DOCUMENTS

JP        2000-315615 A    11/2000

*Primary Examiner* — Noah S Wiese
(74) *Attorney, Agent, or Firm* — Oliff PLC

(57) ABSTRACT

A dielectric composition contains barium titanate, an oxide of yttrium, and an oxide of magnesium. $0.70 \leq \alpha/\beta \leq 1.10$ is satisfied, where a content of the oxide of yttrium is $\alpha$ mol part in terms of $Y_2O_3$, and a content of the oxide of magnesium is $\beta$ mol part in terms of MgO.

10 Claims, 7 Drawing Sheets

(56) References Cited

U.S. PATENT DOCUMENTS

2009/0310279 A1* 12/2009 Sasabayashi ....... C04B 35/4682
                                                           361/321.4
2012/0063056 A1*  3/2012 Takano ................ H01G 4/1227
                                                           361/321.5
2012/0075768 A1*  3/2012 Takeda ................ H01G 4/1227
                                                           361/301.4
2016/0329151 A1* 11/2016 Ishida ..................... H01G 4/30

* cited by examiner

DIELECTRIC COMPOSITION AND MULTILAYER ELECTRONIC DEVICE

BACKGROUND OF THE INVENTION

1. Field of the Invention

The present invention relates to a dielectric composition and a multilayer electronic device.

2. Description of the Related Art

Ceramic electronic devices are widely utilized as miniature, high performance, and high reliability electronic devices, and a large number thereof are used in electrical apparatuses and electronic apparatuses. In recent years, requirements for further miniaturization, higher performance, and higher reliability of ceramic electronic devices have been more and more severe due to the miniaturization and increasingly high performance of devices. In particular, dielectric compositions and ceramic electronic devices improving high-temperature load lifetime and having a high relative permittivity are demanded.

In response to such demand, Patent Document 1 discloses a multilayer ceramic capacitor containing dielectric layers containing barium titanate, $Y_2O_3$, and the like.

However, it is conventionally difficult to improve both high-temperature load lifetime and relative permittivity. When attempting to improve relative permittivity, high-temperature load lifetime is decreased. When attempting to improve high-temperature load lifetime, relative permittivity is decreased.

Patent Document 1: JP 2000-315615 A

SUMMARY OF THE INVENTION

The present invention has been achieved in view of such circumstances. It is an object of the invention to provide a dielectric composition and a multilayer electronic device having favorable relative permittivity, high-temperature load lifetime, and temperature characteristics.

To achieve the above object, the dielectric composition according to the present invention is a dielectric composition containing barium titanate, an oxide of yttrium, and an oxide of magnesium, wherein $0.70 \leq \alpha/\beta \leq 1.10$ is satisfied, where a content of the oxide of yttrium is $\alpha$ mol part in terms of $Y_2O_3$, and a content of the oxide of magnesium is $\beta$ mol part in terms of MgO.

When $\alpha/\beta$ is controlled to the above range, the dielectric composition according to the present invention can have favorable relative permittivity, high-temperature load lifetime, and temperature characteristics.

Preferably, a content of vanadium is 0.02 mol parts or more in terms of $V_2O_5$ provided that a content of barium titanate is 100 mol parts in terms of $BaTiO_3$.

Preferably, a content of yttrium is 0.78 to 2.03 mol parts in terms of $Y_2O_3$ provided that a content of barium titanate is 100 mol parts in terms of $BaTiO_3$.

Preferably, a content of magnesium is 1.12 to 1.85 mol parts in terms of MgO provided that a content of barium titanate is 100 mol parts in terms of $BaTiO_3$.

Preferably, a content of silicon is 1.39 to 2.80 mol parts in terms of $SiO_2$ provided that a content of barium titanate is 100 mol parts in terms of $BaTiO_3$.

The multilayer electronic device according to the present invention is a multilayer electronic device including a dielectric layer, an internal electrode layer, and an external electrode, wherein the dielectric layer is composed of the above dielectric composition.

Preferably, an area ratio occupied by segregated regions of Y on a cross section of the multilayer electronic device is 2.0% or less.

Preferably, an area ratio occupied by segregated regions of Mg on a cross section of the multilayer electronic device is 2.0% or less.

DESCRIPTION OF THE PREFERRED EMBODIMENTS

Hereinafter, the present invention will be described based on an embodiment shown in the figures.

Multilayer Ceramic Capacitor 1

Figure 1:
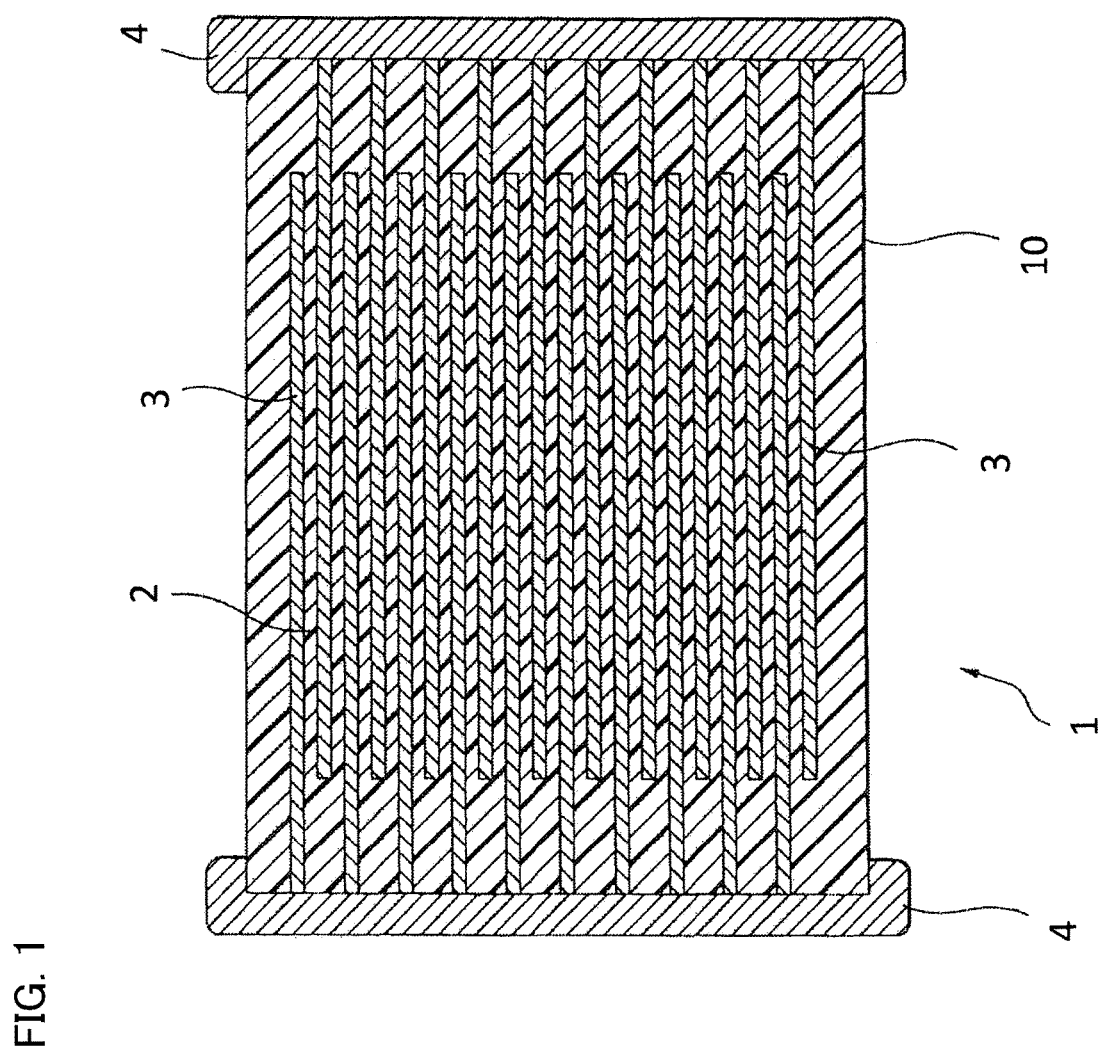
FIG. 1 is a cross section of a multilayer ceramic capacitor according to an embodiment of the present invention.

As shown in FIG. 1, a multilayer ceramic capacitor 1 according to an embodiment of the present invention has a capacitor element body 10 where dielectric layers 2 and internal electrode layers 3 are laminated alternately. The internal electrode layers 3 are laminated in such a manner that each of their end surfaces is alternately exposed on surfaces of the opposing two ends of the capacitor element body 10. A capacitor circuit is constituted in such a manner that a pair of the external electrodes 4 is formed on both ends of the capacitor element body 10 and is connected with the exposed end surfaces of the internal electrode layers 3 arranged alternately.

The capacitor element body 10 has any shape, but normally has a rectangular parallelepiped shape as shown in FIG. 1. The capacitor element body 10 has any size appropriately determined according to application.

Dielectric Layer 2

The dielectric layers 2 are composed of a dielectric composition containing at least barium titanate, an oxide of yttrium, and an oxide of magnesium.

In the present embodiment, barium titanate expressed by a composition formula of $Ba_mTiO_{2+m}$, where $0.995 \leq m \leq 1.002$ and $0.995 \leq Ba/Ti \leq 1.002$ are satisfied, is used preferably. Hereinafter, the composition formula of barium titanate will be represented as $BaTiO_3$.

In the present embodiment, calcium titanate and/or strontium titanate may be mixed with barium titanate. There is no limit to the content of calcium titanate and/or strontium titanate. Calcium titanate and/or strontium titanate may be contained as long as no damage is given to characteristics of the dielectric composition to be obtained. For example, 0.1 mol parts or less of calcium titanate and/or strontium titanate may be contained in total with respect to 100 mol parts of barium titanate.

In the dielectric composition according to the present embodiment, $0.70 \leq \alpha/\beta \leq 1.10$ is satisfied, where a content of the oxide of yttrium is $\alpha$ mol part in terms of $Y_2O_3$, and a content of the oxide of magnesium is $\beta$ mol part in terms of MgO.

The dielectric composition according to the present embodiment is excellent in all of relative permittivity, high-temperature load lifetime, and temperature characteristics due to $0.70 \leq \alpha/\beta \leq 1.10$, and is particularly a dielectric composition achieving both a high relative permittivity and an excellent high-temperature load lifetime. When $\alpha/\beta$ is out of the above range, high-temperature load lifetime is decreased.

Moreover, the dielectric composition according to the present embodiment is excellent in all of relative permittivity, high-temperature load lifetime, and temperature characteristics even without using a coating material, and can thus reduce cost.

When attempting to obtain a dielectric composition particularly excelling in high-temperature load lifetime, $0.81 \leq \alpha/\beta \leq 1.04$ is preferably satisfied. When attempting to obtain a dielectric composition particularly excelling in relative permittivity, $0.70 \leq \alpha/\beta \leq 0.81$ is preferably satisfied.

A content of the oxide of yttrium is not limited, but is preferably 0.78 to 2.03 mol parts in terms of $Y_2O_3$ with respect to 100 mol parts of $BaTiO_3$. When a content of the oxide of yttrium is in the above range, high-temperature load lifetime tends to be favorable.

A content of the oxide of magnesium is not limited, but is preferably 1.12 to 1.85 mol parts in terms of MgO with respect to 100 mol parts of $BaTiO_3$. When a content of the oxide of magnesium is in the above range, resistivity tends to be favorable.

The dielectric composition according to the present embodiment may further contain an oxide of silicon. A content of the oxide of silicon is not limited, but is preferably 1.39 to 2.80 mol parts in terms of $SiO_2$ with respect to 100 mol parts of $BaTiO_3$. When a content of the oxide of silicon is in the above range, relative permittivity tends to be favorable.

The reason why a dielectric composition excelling in all of relative permittivity, high-temperature load lifetime, and temperature characteristics can be obtained by controlling $\alpha/\beta$ to a predetermined range is unclear, but the present inventors consider the reason as below.

A dielectric composition using barium titanate conventionally has a high relative permittivity as barium titanate is a ferroelectric substance, but is unstable and insufficient with respect to high-temperature load lifetime.

Rare earth elements (paraelectrics), such as yttrium, are reacted with barium titanate and solid soluted in a manufacturing process of a dielectric composition, which improves stability of the dielectric composition and contributes to improvement in high-temperature load lifetime of the dielectric composition.

On the other hand, the dielectric composition containing rare earth elements, such as yttrium, magnesium, and silicon has segregations of rare earth elements, magnesium, and silicon formed in a manufacturing process.

The segregated rare earth elements are not solid soluted in barium titanate, and thus do not contribute to improvement in high-temperature load lifetime. That is, if the rare earth elements are segregated excessively, there is a tendency that an improvement effect on high-temperature load lifetime is hard to be obtained. Moreover, rare earth elements and titanium are easily segregated at the same time, and an area where rare earth elements and titanium are segregated at the same time is a starting point of resistance deterioration. Thus, high-temperature load lifetime tends to rather deteriorate if there are too many areas where rare earth elements and titanium are segregated at the same time.

When magnesium is segregated excessively, relative permittivity tends to decrease, contact properties between internal electrodes and external electrodes mentioned below tend to deteriorate, and capacity tends to decrease. When silicon is segregated excessively, relative permittivity tends to decrease, contact properties between internal electrodes and external electrodes mentioned below tend to deteriorate, and capacity tends to decrease. The reason why the contact properties tend to deteriorate is that magnesium and silicon tend to be easily segregated at the same time around the electrodes (especially around ends of the electrodes), and the generated segregations tend to prevent the internal electrodes and the external electrodes from contacting with each other.

Here, the present inventors have found that segregations of yttrium, magnesium, and silicon can be prevented by using yttrium as a rare earth element and controlling $\alpha/\beta$ to 0.70 or more and 1.10 or less. Then, the present inventors have found that high-temperature load lifetime can be improved significantly while relative permittivity and temperature characteristics are maintained favorably.

There is no limit to an evaluation method for segregated amounts of yttrium, magnesium, and silicon. For example, the segregated amounts of yttrium, magnesium, and silicon can be evaluated in such a manner that element mapping images are prepared by observing a cross section using a scanning transmission electron microscope (STEM) or an electron probe micro analyzer (EPMA), the element mapping images are subjected to an image processing for determination of segregated regions, and the segregated amounts are evaluated by how large the area of segregated regions is.

An evaluation method for the segregated amounts by an EPMA will be described in detail.

First, a multilayer ceramic capacitor 1 is cut vertically to a lamination direction.

Next, the cut cross section is observed using an EPMA. There is no limit to magnification or size of a visual field. For example, an element mapping of Mg element, Si element, and Y element is carried out in a visual field of (20 to 115 μm)×(15 to 86 μm) with a magnification of 1000 to 5000, and element mapping images of the Mg element, the Si element, and the Y element are obtained.

Next, an average intensity of each element is calculated on the element mapping image of each element. Next, an image processing is carried out for determination of a region whose intensity is twice or more than the average intensity of each element. The region whose intensity is twice or more than the average intensity of each element is determined as a region where each element is segregated. Incidentally, in the present embodiment, the internal electrode layers 3 may be contained in visual fields of the element mapping images, and the average intensity of each element is calculated by also containing portions of the internal electrode layers 3. Incidentally, there is no limit to an area ratio of the portions of the internal electrode layers 3 occupied in the visual field of the entire element mapping image, but is preferably 30% or less.

An area ratio of segregated regions of each element is calculated, and segregated amounts are evaluated by the area ratio of each element. Incidentally, a parameter in the calculation of the area ratio of segregated regions of each element also includes an area of the portions of the internal electrode layers 3.

In the present embodiment, a case where an area ratio of segregated regions of Mg is 2.0% or less is determined as having a small segregated amount of Mg and being preferable. A case where an area ratio of segregated regions of Mg is 0.01 to 2.0% is determined as being more preferable, and a case where an area ratio of segregated regions Mg is 0.1 to 1.8% is determined as being still more preferable.

A case where an area ratio of segregated regions of Si is 4.0% or less is determined as having a small segregated amount of Si and being preferable. A case where an area ratio of segregated regions of Si is 2.0% or less is determined as being more preferable.

A case where an area ratio of segregated regions of Y is 2.0% or less is determined as having a small segregated amount of Y and being preferable. A case where an area ratio of segregated regions of Y is 0.01 to 2.0% is determined as being more preferable, and a case where an area ratio of segregated regions of Y is 0.1 to 1.8% is determined as being still more preferable.

The dielectric composition according to the present embodiment may further contain other components based on desired characteristics. Examples of other components will be shown below.

In addition to barium titanate, the dielectric composition according to the present embodiment may contain an oxide of barium. A content of the oxide of barium is not limited, but is preferably 0.57 to 1.33 mol parts in terms of BaO with respect to 100 mol parts of $BaTiO_3$. When a content of the oxide of barium is in the above range, a fluctuation of relative permittivity due to change in firing temperature tends to be prevented.

The dielectric composition according to the present embodiment may contain an oxide of calcium. A content of the oxide of calcium is not limited, but is preferably 0.41 to 1.30 mol parts in terms of CaO with respect to 100 mol parts of $BaTiO_3$. When a content of the oxide of calcium is in the above range, high-temperature load lifetime and relative permittivity tend to be favorable. The above-mentioned oxides of silicon, barium, and calcium may be added separately, or may be added together as a form of $(Ba, Ca)SiO_3$.

The dielectric composition according to the present embodiment may contain an oxide of chromium. A content of the oxide of chromium is not limited, but is preferably 0.14 to 0.20 mol parts in terms of $Cr_2O_3$ with respect to 100 mol parts of $BaTiO_3$. When a content of the oxide of chromium is in the above range, reduction resistance tends to improve, and resistivity tends to be favorable. Instead of the oxide of chromium, the dielectric composition according to the present embodiment may contain an oxide of manganese. A content of the oxide of manganese is not limited, but is preferably 0.14 to 0.20 mol parts in terms of MnO with respect to 100 mol parts of $BaTiO_3$. Needless to say, the dielectric composition according to the present embodiment may contain both an oxide of chromium and an oxide of manganese.

The dielectric composition according to the present embodiment may contain an oxide of vanadium. A content of the oxide of vanadium is not limited, but is preferably 0.02 mol parts or more, more preferably 0.02 to 0.10 mol parts, in terms of $V_2O_5$ with respect to 100 mol parts of $BaTiO_3$. The larger a content of the oxide of vanadium is, the further high-temperature load lifetime and temperature characteristics tend to improve. The smaller a content of the oxide of vanadium is, the further relative permittivity and resistivity tend to improve.

In addition to the above oxides, the dielectric composition according to the present embodiment may further contain other oxides used in the present technical field. The dielectric composition according to the present embodiment may contain any kind and any content of other oxides as long as no damage is given to characteristics of the dielectric composition to be obtained.

Internal Electrode Layer 3

A conductive material contained in the internal electrode layer 3 is not limited, but a constituent material of the dielectric layer 2 has reduction resistance, and a comparatively low-cost base metal can be thus employed. Ni or an Ni alloy is preferable as the base metal employed as the conductive material. An alloy of Ni and one or more elements selected from Mn, Cr, Co, and Al is preferable as the Ni alloy, and an amount of Ni in the alloy is preferably 95 wt % or more. Incidentally, Ni or the Ni alloy may contain about 0.1 wt % or less of various kinds of trace components, such as P. The internal electrode layer 3 has a thickness appropriately determined according to application or so, but normally has a thickness of about 1.0 to 1.5 μm, preferably has a thickness of about 1.0 to 1.2 μm.

External Electrode 4

A conductive material contained in the external electrode 4 is not limited, but low-cost Ni, Cu, or an alloy of these can be employed in the present invention. The external electrode 4 has a thickness appropriately determined according to application or so, but normally preferably has a thickness of about 10 to 50 μm.

Manufacturing Method of Multilayer Ceramic Capacitor 1

The multilayer ceramic capacitor 1 according to the present embodiment is manufactured similarly to conventional multilayer ceramic capacitors by preparing a green chip with an ordinary printing method or sheet method using a paste, firing this, and then firing this after external electrodes are printed or transferred thereon. Hereinafter, a manufacturing method of the multilayer ceramic capacitor 1 according to the present embodiment will be described specifically.

First, a dielectric raw material (mixed raw material powder) contained in a dielectric layer-dedicated paste is prepared and turned into a paint, and the dielectric layer-dedicated paste is prepared.

The dielectric layer-dedicated paste may be an organic based paint kneading the dielectric raw material and an organic vehicle, or may be a water based paint.

First, a raw material of barium titanate and a raw material of oxides of elements, such as Y and Mg, are prepared as dielectric raw materials. These raw materials include oxides, mixtures, and composite oxides of the above-mentioned elements, and also include a mixture of various compounds to be the above-mentioned oxides or composite oxides after firing appropriately selected from carbonates, oxalates, nitrates, hydroxides, organic metallic compounds, or the like. α/β is adjusted by any method, and is adjusted by controlling a ratio of contents of the raw material of the oxide of Y and the raw material of the oxide of Mg, for example.

A raw material of barium titanate may be manufactured by a variety of methods, such as liquid phase methods (e.g., oxalate method, hydrothermal method, alkoxide method, sol-gel method etc.), in addition to a so-called solid phase method, and may be a commercially available barium titanate.

A raw material of barium titanate preferably has a BET specific surface area value of 1.7 to 2.5 m$^2$/g. When using a raw material of barium titanate having such a BET specific surface area value, high-temperature load lifetime tends to be favorable, and relative permittivity tends to be high.

In the present embodiment, the dielectric composition excelling in high-temperature load lifetime or so can be obtained even if using a raw material of barium titanate that is cheaper than before, specifically a raw material of barium titanate having a large average particle size.

The surface of the raw material powder of barium titanate may be coated with the raw material powders of oxides of elements, such as Y and Mg, by any method, such as a well-known method. The dielectric composition according to the present embodiment can obtain excellent characteristics and reduce cost even if no coating material is used for the raw material powders, but a coating material may be coated on the surface of the raw material powders of barium titanate or so.

Contents of each compound in the dielectric raw material are determined so that the dielectric composition has the above-mentioned compositions after firing. The dielectric composition normally has a composition that does not substantially change between before and after firing. The dielectric raw material before turning into a paint normally has an average particle size of about 0.70 to 0.90 μm.

The organic vehicle is made by dissolving a binder in an organic solvent. The binder used for the organic vehicle is not limited, and is appropriately selected from various ordinary binders, such as ethyl cellulose and polyvinyl butyral. The organic solvent to be used is not limited either, and is appropriately selected from various organic solvents, such as terpineol, butyl carbitol, acetone, and toluene, according to a method utilized, such as a printing method and a sheet method.

When a water based paint is used as the dielectric layer-dedicated paste, the dielectric raw materials and a water based vehicle made by dissolving the likes of a water soluble binder or dispersing agent in water are kneaded. The water soluble binder employed in the water based vehicle is not limited, and polyvinyl alcohol, cellulose, a water soluble acrylic resin, or the like is employed.

An internal electrode layer-dedicated paste is prepared by kneading the above-mentioned organic vehicle and either a conductive material composed of the above-mentioned various kinds of conductive metals and alloys or various kinds of oxides, organic metal compounds, resinates, or the like to be the above-mentioned conductive material after firing. The internal electrode layer-dedicated paste may contain a common material. The common material is not limited, but preferably has a composition similar to that of the main component.

An external electrode-dedicated paste is prepared similarly to the above-mentioned internal electrode layer-dedicated paste.

Contents of the organic vehicle in each of the above-mentioned pastes are not limited, and normal contents (e.g., binder: about 2 to 6 wt %, solvent: about 15 to 55 wt %) are selected. If necessary, each of the pastes may contain additives selected from various dispersing agents, plasticizing agents, dielectrics, insulators, and so on. The total content of these additives is preferably 10 wt % or less.

When a printing method is employed, the dielectric layer-dedicated paste and the internal electrode layer-dedicated paste are printed on a substrate of PET or the like, laminated, and cut in a predetermined shape, after which the cut portions are peeled off from the substrate to obtain green chips.

When a sheet method is employed, a green sheet is formed using the dielectric layer-dedicated paste, the internal electrode layer-dedicated paste is printed and an internal electrode pattern is formed on this green sheet, after which these are laminated to obtain a green chip.

A debinding treatment is performed on the green chip before firing. In debinding conditions, a temperature increase rate is preferably 20 to 300° C./hour, a holding temperature is preferably 180 to 400° C., and a temperature holding time is preferably 0.5 to 20 hours. A debinding atmosphere is air or a reducing atmosphere.

In firing of the green chip, a temperature increase rate is preferably 200 to 2000° C./hour.

A holding temperature during firing is preferably 1230 to 1310° C., and its holding time is preferably 0.2 to 4 hours, more preferably 2 to 3 hours. When the holding temperature and/or the holding time are/is out of the above range(s), sintering becomes insufficient, and yttrium, magnesium, and/or silicon are/is easily segregated excessively. When the holding temperature and/or the holding time are/is more than the above range(s), it becomes easy to generate breakage of the electrodes due to abnormal sintering of the internal electrode layers, deterioration of capacity temperature characteristics due to diffusion of an internal electrode layer constituent material, reduction of the dielectric composition, and the like.

A firing atmosphere is preferably a reducing atmosphere. A humidified mixed gas of $N_2$ and $H_2$ can be employed as an atmospheric gas, for example.

An oxygen partial pressure during firing is appropriately determined according to kind of a conductive material in the internal electrode layer-dedicated paste, but when a base metal of the likes of Ni or an Ni alloy is employed as the conductive material, an oxygen partial pressure in the firing atmosphere is preferably $10^{-14}$ to $10^{-10}$ MPa. When the oxygen partial pressure is less than the range, the conductive material of the internal electrode layers may have abnormal sintering and may be broken. When the oxygen partial pressure is more than the range, the internal electrode layers tend to be oxidized. A temperature decrease rate is preferably 50 to 500° C./hour.

After undergoing firing in a reducing atmosphere, the capacitor element body preferably undergoes annealing. The annealing is a treatment for reoxidizing the dielectric layers, which can increase high-temperature acceleration lifetime.

An oxygen partial pressure in an annealing atmosphere is preferably $10^{-9}$ to $10^{-5}$ MPa. When the oxygen partial pressure is less than the range, reoxidation of the dielectric layers tends to be difficult. When the oxygen partial pressure is more than the range, oxidation of the internal electrode layers tends to progress.

A holding temperature during annealing is preferably 950 to 1150° C. When the holding temperature is less than the range, the dielectric layers are oxidized insufficiently, and high-temperature acceleration lifetime decreases easily. On the other hand, when the holding temperature is more than the range, the internal electrode layer is reacted with a dielectric base and easily causes deterioration of temperature characteristics and decrease in high-temperature acceleration lifetime, as well as being oxidized and causing decrease in capacity. Incidentally, the annealing may consist of only a temperature increase process and a temperature decrease process. That is, temperature holding time may be zero. In this case, holding temperature is identical to maximum temperature.

Regarding annealing conditions other than these, a temperature holding time is preferably 0 to 20 hours, and a temperature decrease rate is preferably 50 to 500° C./hour. For example, humidified $N_2$ gas or so is preferably employed as an atmospheric gas of the annealing.

For example, a wetter or so is used for humidifying $N_2$ gas or mixed gas or so in the above-mentioned debinding treatment, firing, and annealing. In this case, a water temperature is preferably about 5 to 75° C.

The debinding treatment, firing, and annealing may be performed in succession or independently.

The capacitor element body obtained as described above undergoes end surface polishing by barrel polishing, sand blasting, or the like, and is coated with the external electrode-dedicated paste and then fired to form the external electrodes 4. If necessary, a covering layer is formed on the surfaces of the external electrodes 4 by plating or so.

The multilayer ceramic capacitor 1 according to the present embodiment thus manufactured is mounted, for example, on a printed board by solder or so, and is used in various kinds of electronic apparatuses, and so on.

The embodiment of the present invention have been described, but the present invention is not limited to the above-mentioned embodiment and may be variously modified within the scope not deviating from the object of the present invention.

In the above-mentioned embodiment, a multilayer ceramic capacitor was exemplified as the multilayer electronic device according to the present invention, but the multilayer electronic device according to the present invention is not limited to a multilayer ceramic capacitor and may be any multilayer electronic device having the above features.

EXAMPLES

Hereinafter, the present invention will be described based on more detailed examples, but is not limited to the examples.

First, a $BaTiO_3$ powder, a $Y_2O_3$ powder, a $MgCO_3$ powder, a BaO powder, a CaO powder, a $SiO_2$ powder, a $Cr_2O_3$ powder, and a $V_2O_5$ powder were prepared respectively as raw material powders. Each of the raw material powders was weighed so that dielectric layers of capacitor samples to be finally obtained had compositions shown in Table 1. Incidentally, the $BaTiO_3$ powder had a BET specific surface area value of 2.2 $m^2/g$.

Next, each of the above-prepared raw material powders was wet-blended and pulverized for 10 hours by a ball mill, and then dried to obtain a mixed raw material powder. Incidentally, $MgCO_3$ was contained in a dielectric composition as MgO after firing.

Next, 100 weight parts of the obtained mixed raw material powder, 10 weight parts of a polyvinyl butyral resin, 5 weight parts of dioctyl phthalate (DOP) as a plasticizing agent, and 100 weight parts of an alcohol as a solvent were blended in a ball mill to form a paste, thereby obtaining a dielectric layer-dedicated paste.

Apart from the above, 44.6 weight parts of Ni particles, 52 weight parts of terpineol, 3 weight parts of ethyl cellulose, and 0.4 weight parts of benzotriazole were kneaded by a triple roll milling machine to form a slurry, whereby an internal electrode layer-dedicated paste was prepared.

Then, a green sheet was formed on a PET film to have a thickness of 2 μm after being dried using the dielectric layer-dedicated paste produced as above. Next, an electrode layer was printed with a predetermined pattern on this green sheet using the internal electrode layer-dedicated paste, and then the sheet was peeled from the PET film, whereby a green sheet having the electrode layer was prepared. Next, a plurality of the green sheets having electrode layers was laminated and pressure-bonded to be made into a green laminated body, and this green laminated body was cut into a predetermined size, whereby a green chip was obtained.

Next, the obtained green chip underwent a debinding treatment, firing, and annealing under the following conditions to obtain a multilayer ceramic fired body.

As debinding treatment conditions, temperature increase rate was 25° C./hour, holding temperature was 260° C., temperature holding time was 8 hours, and atmosphere was in the air.

As firing conditions, temperature increase rate was 2000° C./hour, holding temperature was 1200° C., and holding time was 1 hour. Temperature decrease rate was 2000° C./hour. Incidentally, atmospheric gas was a humidified $N_2+H_2$ mixed gas, and oxygen partial pressure was configured to be $10^{-12}$ MPa.

As annealing conditions, temperature increase rate was 200° C./hour, holding temperature was 1000° C., temperature holding time was 2 hours, temperature decrease rate was 200° C./hour, and atmospheric gas was humidified $N_2$ gas (oxygen partial pressure: $10^{-7}$ MPa).

Incidentally, a wetter was used for humidification of the atmospheric gas during firing and annealing.

Next, an end surface of the obtained multilayer ceramic fired body was polished by sand blasting, then Cu was applied as an external electrode, and a sample of the multilayer ceramic capacitor shown in FIG. 1 was obtained. The obtained capacitor sample had a size of 3.2 mm×1.6 mm×0.6 mm. The dielectric layer had a thickness of 1.5 μm. The internal electrode layer had a thickness of 1.0 μm. The number of the dielectric layers sandwiched by the internal electrode layers was 200.

It was confirmed that the dielectric layers of the obtained capacitor samples had compositions of Table 1. Moreover, the following methods were respectively applied to measurements of relative permittivity εs, high-temperature load lifetime η (hr), electrostatic capacity change rate TC (%) at 125° C., resistivity ρ (Ω·m), and area ratio occupied by segregated regions of Mg and Y. Table 1 shows the results.

Measurement of Relative Permittivity εs

With respect to the obtained capacitor samples, relative permittivity εs (no unit) was calculated from electrostatic capacity measured at a reference temperature of 25° C. by a digital LCR meter with conditions of a frequency of 1 kHz and an input signal level (measurement voltage) of 1 Vrms. A relative permittivity εs of 2400 or more was considered to be favorable, and a relative permittivity εs of 2600 or more was considered to be more favorable.

Measurement of High-Temperature Load Lifetime η

With respect to the obtained capacitor samples, a lifetime was measured at 200° C. in an electric field of 25 V/μm with an applying state of a DC voltage. In the present examples, a time from the beginning of application of the DC voltage to the drop of insulation resistance by one order was defined as a lifetime of the capacitor sample. The above evaluation was conducted for 20 capacitor samples, and an average value of the lifetimes was defined as a high-temperature load lifetime η. A high-temperature load lifetime η of 15 hours or longer was considered to be favorable, and a high-temperature load lifetime η of 30 hours or longer was considered to be more favorable.

Measurement of Electrostatic Capacity Change Rate TC

With respect to the obtained capacitor samples, an electrostatic capacity was measured at a reference temperature of 25° C. and a measurement temperature of 125° C. by a digital LCR meter with conditions of a frequency of 1 kHz and an input signal level (measurement voltage) of 1 Vrms, and a change rate of an electrostatic capacity at the measurement temperature of 125° C. to an electrostatic capacity at the reference temperature of 25° C. was calculated. In the present examples, a TC of ±10% was considered to be favorable.

Measurement of Resistivity ρ

With respect to the obtained capacitor samples, an insulation resistance (IR) was measured using an insulation resistance meter after a voltage of 10V was applied for 30 seconds at a reference temperature of 25° C., and a resistivity ρ was calculated based on a thickness of a dielectric layer, an effective electrode area, and the insulation resistance (IR) obtained by the measurement. A capacitor sample having a resistivity ρ of 1.5E+10 Ω·m or more was considered to be favorable. Incidentally, "1.5E+10" means 1.5×10$^{10}$. The object of the present invention can be achieved even if a resistivity ρ was not favorable.

Observation of Area Ratios Occupied by Segregated Regions of Mg, Si, and Y

The obtained capacitor samples were cut vertically to a lamination direction. Then, the obtained cut surface was observed using an electron probe microanalyser (EPMA). Element mappings of Mg element, Si element, and Y element were conducted in a visual field of 38.4 μm×28.8 μm by a magnification of 3000, and element mapping images of Mg element, Si element, and Y element were obtained.

Next, an average intensity of each element in the element mapping images of the elements was calculated. Next, an image processing was carried out so that regions whose intensity was twice ore more than the average intensity of each element were determined. A region whose intensity was twice or more than the average intensity of each element was considered to be a region where each element was segregated.

Then, areas of the regions where each element was segregated were calculated by image analysis, and area ratios of the segregations of each element were calculated.

TABLE 1

| Sample No. | BaTiO3 mol | BaO mol | CaO mol | SiO2 mol | Y2O3 (α) mol | MgO (β) mol | Cr2O3 mol | V2O5 mol | Composition ratio α/β | ε s |
|---|---|---|---|---|---|---|---|---|---|---|
| 1* | 100.00 | 1.15 | 0.85 | 1.99 | 0.78 | 1.72 | 0.20 | 0.06 | 0.45 | 3016 |
| 2* | 100.00 | 1.15 | 0.85 | 1.99 | 1.03 | 1.72 | 0.20 | 0.06 | 0.60 | 2827 |
| 3* | 100.00 | 1.15 | 0.85 | 1.99 | 1.03 | 1.50 | 0.20 | 0.06 | 0.69 | 2885 |
| 4 | 100.00 | 1.15 | 0.85 | 1.99 | 0.78 | 1.12 | 0.20 | 0.06 | 0.70 | 2703 |
| 5 | 100.00 | 1.33 | 0.98 | 2.30 | 0.78 | 1.12 | 0.20 | 0.06 | 0.70 | 3015 |
| 6 | 100.00 | 1.10 | 1.30 | 2.80 | 1.03 | 1.30 | 0.20 | 0.06 | 0.79 | 3039 |
| 7 | 100.00 | 0.81 | 0.58 | 1.39 | 1.05 | 1.30 | 0.14 | 0.07 | 0.81 | 2699 |
| 8 | 100.00 | 0.57 | 0.41 | 1.39 | 1.05 | 1.30 | 0.14 | 0.07 | 0.81 | 2666 |
| 9 | 100.00 | 0.81 | 0.58 | 1.59 | 1.21 | 1.30 | 0.14 | 0.07 | 0.93 | 2486 |
| 10 | 100.00 | 1.15 | 0.85 | 1.99 | 1.80 | 1.72 | 0.20 | 0.10 | 1.04 | 2427 |
| 11 | 100.00 | 1.15 | 0.85 | 1.99 | 2.03 | 1.85 | 0.20 | 0.10 | 1.10 | 2503 |
| 12* | 100.00 | 1.15 | 1.25 | 1.99 | 1.25 | 1.12 | 0.20 | 0.06 | 1.11 | 2946 |
| 13* | 100.00 | 1.70 | 1.26 | 2.98 | 2.04 | 1.69 | 0.23 | 0.14 | 1.21 | 2609 |
| 14* | 100.00 | 1.15 | 0.85 | 1.99 | 1.03 | 0.80 | 0.20 | 0.06 | 1.29 | 3057 |

| Sample No. | η (hr) | 125° C. TC (%) | ρ (Ω·m) | Area ratio of Mg segregation (%) | Area ratio of Si segregation (%) | Area ratio of Y segregation (%) |
|---|---|---|---|---|---|---|
| 1* | 1.3 | −7.8 | 3.5.E+10 | 4.89 | 5.63 | 4.40 |
| 2* | 12.9 | −8.0 | 3.2.E+10 | 2.93 | 4.20 | 3.43 |
| 3* | 14.6 | −8.3 | 3.0.E+10 | 2.10 | 2.75 | 2.30 |
| 4 | 21.7 | −7.4 | 2.7.E+10 | 1.63 | 2.93 | 1.58 |
| 5 | 17.7 | −8.1 | 2.2.E+10 | 1.53 | 3.78 | 1.80 |
| 6 | 23.7 | −9.8 | 2.7.E+10 | 0.49 | 1.05 | 1.05 |
| 7 | 31.4 | −7.4 | 2.8.E+10 | 0.53 | 0.43 | 0.37 |
| 8 | 40.3 | −6.4 | 1.9.E+10 | 0.05 | 0.32 | 0.11 |
| 9 | 45.5 | −6.7 | 1.8.E+10 | 0.08 | 0.54 | 0.10 |
| 10 | 34.1 | −5.8 | 2.7.E+10 | 0.48 | 0.92 | 0.50 |
| 11 | 17.5 | −7.6 | 2.9.E+10 | 0.96 | 1.81 | 1.20 |
| 12* | 0.2 | −8.3 | 3.5.E+10 | 2.22 | 3.51 | 4.50 |
| 13* | 0.2 | −8.2 | 8.8.E+10 | 4.20 | 6.68 | 4.70 |
| 14* | 0.3 | −7.8 | 2.5.E+10 | 2.13 | 4.64 | 5.30 |

*Comparative Examples

Table 1 shows that Examples (Sample No. 4 to Sample No. 11), whose composition ratio (=α/β) of Y$_2$O$_3$/MgO was in a range of 0.70 to 1.10, had a high-temperature load lifetime η that was excellent compared to that of Comparative Examples (Sample No. 1 to Sample No. 3 and Sample No. 12 to Sample No. 14), whose α/β was out of the range of 0.70 to 1.10. Moreover, the other characteristics of Sample No. 4 to Sample No. 11 were favorable.

Figure 2:
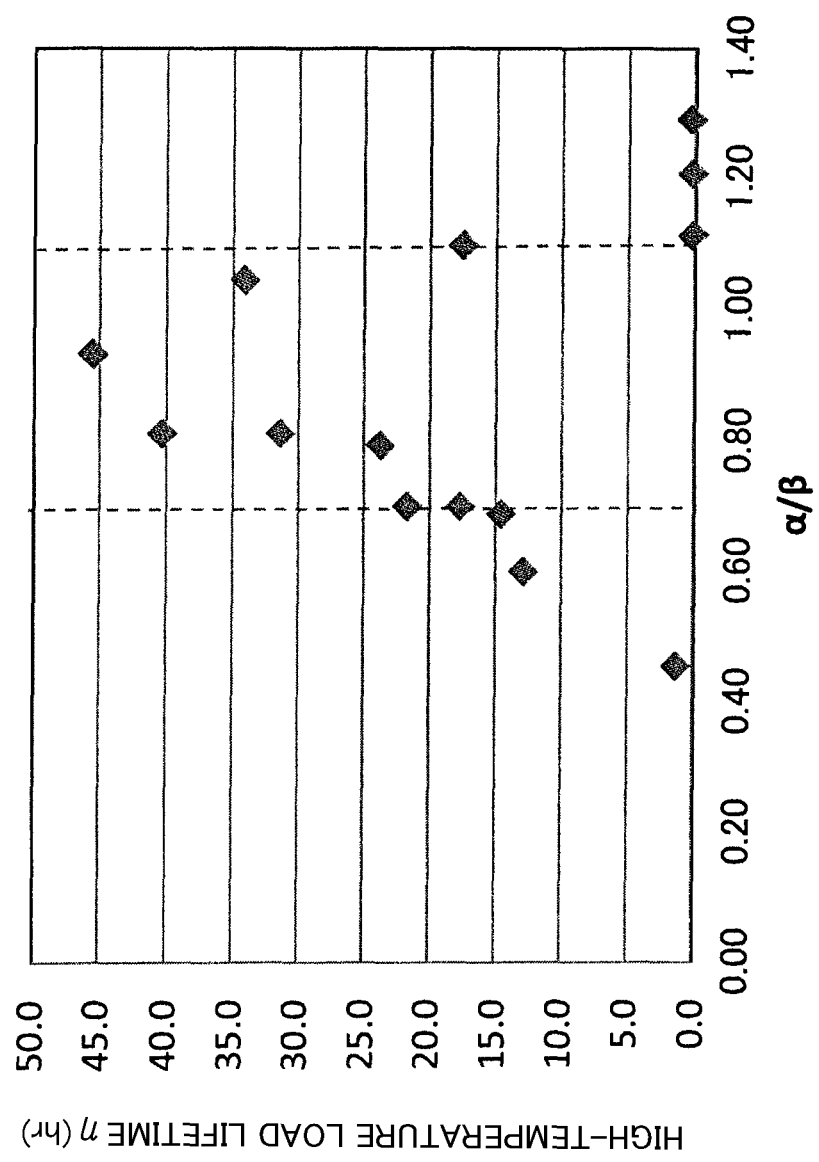
FIG. 2 is a graph whose vertical axis is high-temperature load lifetime and horizontal axis is $\alpha/\beta$.
Figure 3:
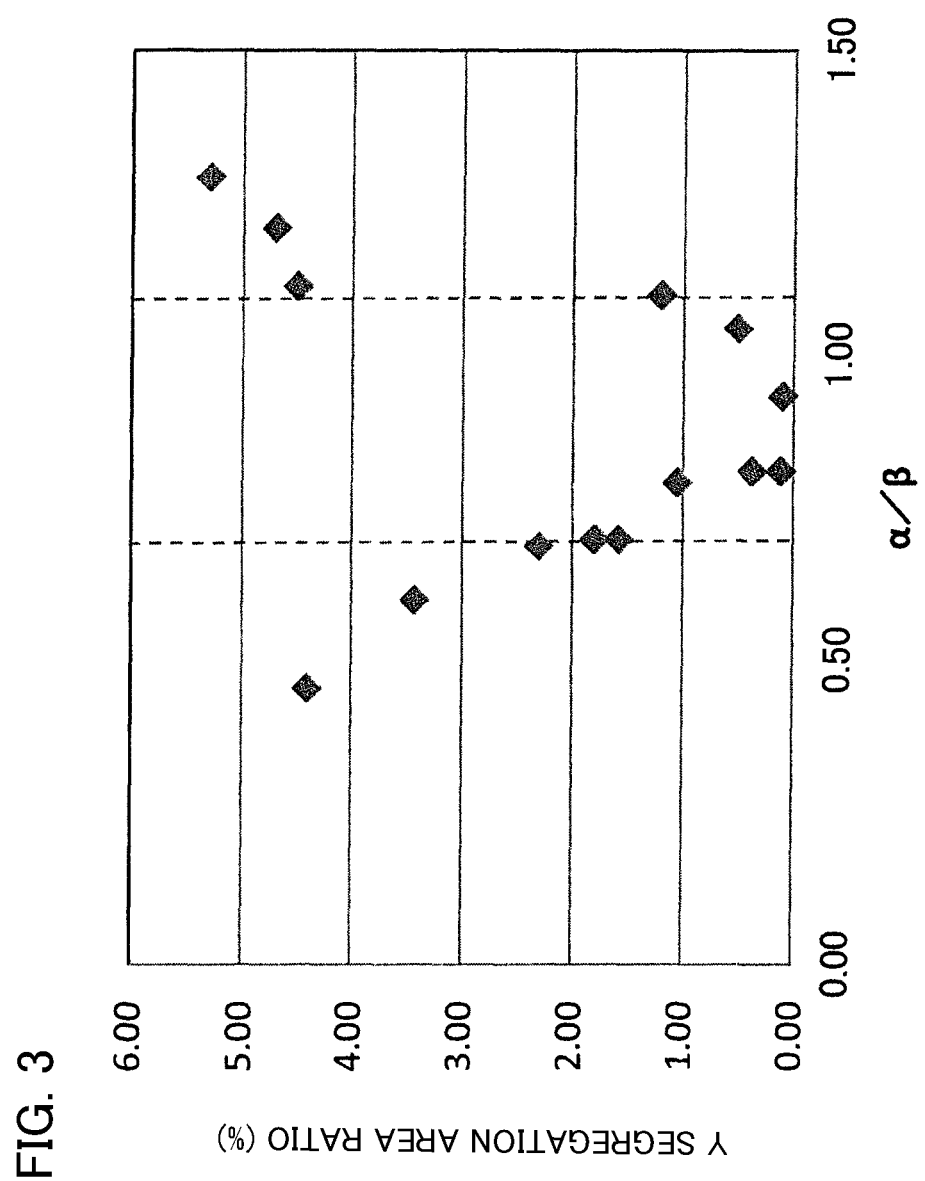
FIG. 3 is a graph whose vertical axis is an area ratio occupied by segregated regions of Y and horizontal axis is $\alpha/\beta$.
Figure 4:
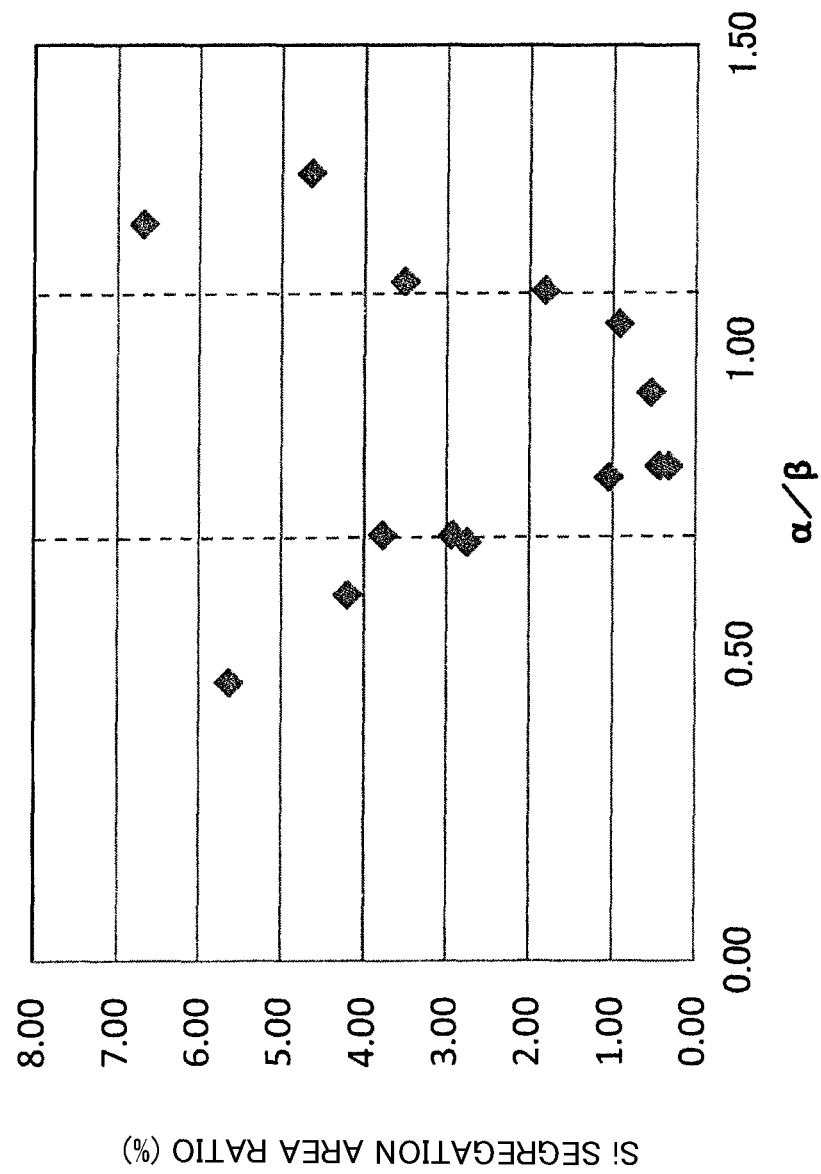
FIG. 4 is a graph whose vertical axis is an area ratio occupied by segregated regions of Si and horizontal axis is $\alpha/\beta$.
Figure 5:
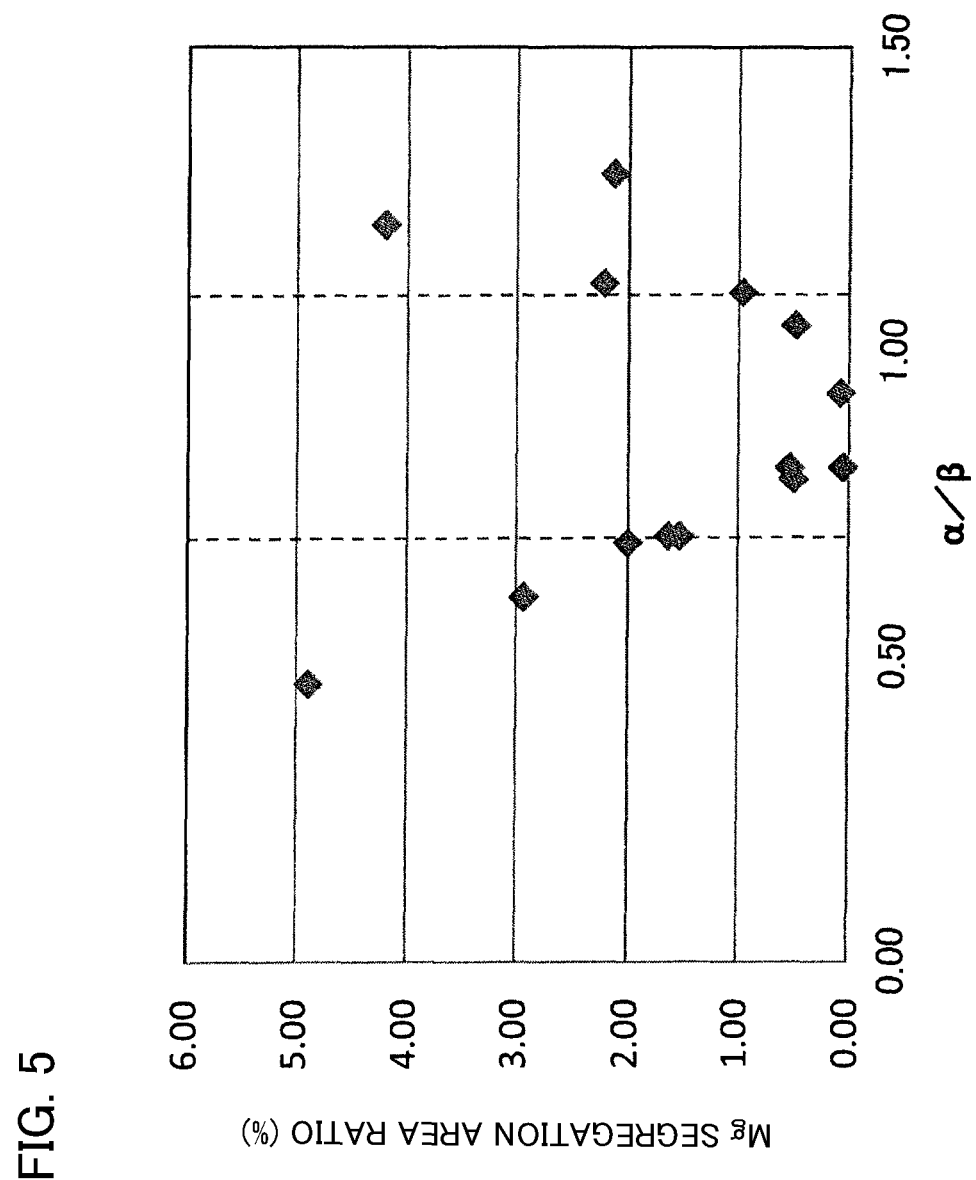
FIG. 5 is a graph whose vertical axis is an area ratio occupied by segregated regions of Mg and horizontal axis is $\alpha/\beta$.
Figure 6:
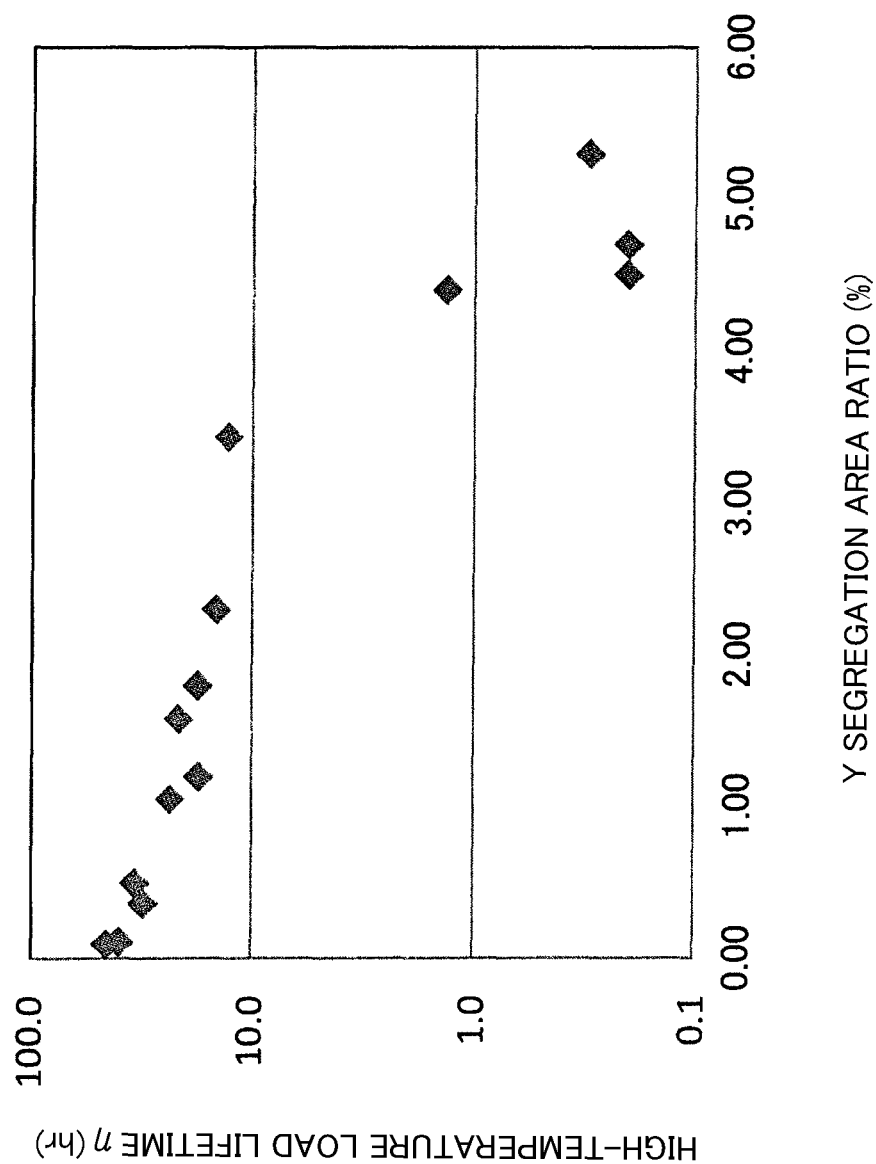
FIG. 6 is a graph whose vertical axis is a high-temperature load lifetime and horizontal axis is an area ratio occupied by segregated regions of Y.
Figure 7:
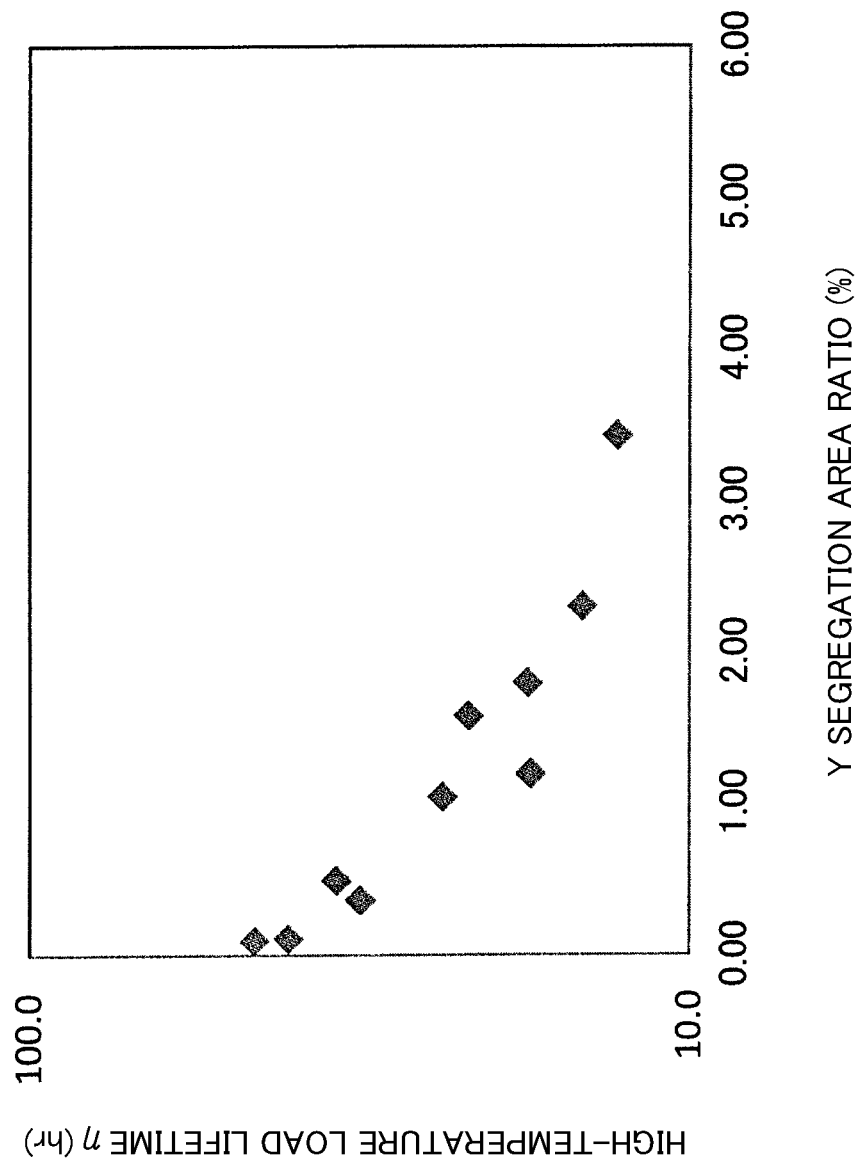
FIG. 7 is a partially enlarged graph of FIG. 6.

Here, FIG. 2 was prepared. In FIG. 2, the vertical axis is high-temperature load lifetime η, the horizontal axis is α/β, and Sample No. 1 to Sample No. 14 in Table 1 are plotted. Moreover, FIG. 3 to FIG. 5 were prepared. In FIG. 3, the vertical axis is an area ratio occupied by segregated regions of Y. In FIG. 4, the vertical axis is an area ratio occupied by segregated regions of Si. In FIG. 5, the vertical axis is an area ratio occupied by segregated regions of Mg. Moreover, FIG. 6 is a semilogarithmic graph whose vertical axis is a high-temperature load lifetime and horizontal axis is an area ratio occupied by segregated regions of Y. FIG. 7 is a partially enlarged graph of FIG. 6.

FIG. 2 shows that when α/β is in the range of 0.70 to 1.10, high-temperature load lifetime η is excellent compared to when α/β is out of the range of 0.70 to 1.10. Moreover, FIG. 3 to FIG. 5 show that when α/β is in the range of 0.70 to 1.10, area ratios occupied by segregated regions of Y, Mg, and Si tend to be small.

Moreover, FIG. 6 and FIG. 7 show that the smaller an area ratio occupied by segregated regions of Y is, the more favorable a high-temperature load lifetime is, and a high-temperature load lifetime changes significantly around 4%. When an area ratio occupied by the segregated regions of Y is more than 4%, sintering shortage is often generated in the first place. When sintering shortage is generated, high-temperature load lifetime tends to decrease significantly.

Example 2

Sample No. 16 and Sample No. 17 were prepared by changing a content of vanadium with respect to Sample No. 7 of Example 1, and were evaluated in a similar manner to Example 1. Sample No. 18 and Sample No. 19 were prepared by changing a content of vanadium with respect to Sample No. 4 of Example 1, and were evaluated in a similar manner to Example 1. Table 2 shows the results.

TABLE 2

| Sample No. | BaTiO3 mol | BaO mol | CaO mol | SiO2 mol | Y2O3 (α) mol | MgO (β) mol | Cr2O3 mol | V2O5 mol | Composition ratio α/β |
|---|---|---|---|---|---|---|---|---|---|
| 16 | 100.00 | 0.81 | 0.58 | 1.39 | 1.05 | 1.30 | 0.14 | 0.02 | 0.81 |
| 7  | 100.00 | 0.81 | 0.58 | 1.39 | 1.05 | 1.30 | 0.14 | 0.07 | 0.81 |
| 17 | 100.00 | 0.81 | 0.58 | 1.39 | 1.05 | 1.30 | 0.14 | 0.20 | 0.81 |
| 18 | 100.00 | 1.15 | 0.85 | 1.99 | 0.78 | 1.12 | 0.20 | 0.02 | 0.70 |
| 4  | 100.00 | 1.15 | 0.85 | 1.99 | 0.78 | 1.12 | 0.20 | 0.06 | 0.70 |
| 19 | 100.00 | 1.15 | 0.85 | 1.99 | 0.78 | 1.12 | 0.20 | 0.10 | 0.70 |

| Sample No. | ε s | η (hr) | 125° C. TC (%) | ρ (Ω·m) | Area ratio of Mg based segregation (%) | Area ratio of Si based segregation (%) | Area ratio of Y based segregation (%) |
|---|---|---|---|---|---|---|---|
| 16 | 2897 | 15.1 | -9.9 | 3.8.E+10 | 0.51 | 0.44 | 0.38 |
| 7  | 2699 | 31.4 | -7.4 | 2.8.E+10 | 0.53 | 0.43 | 0.37 |
| 17 | 2410 | 37.8 | -2.7 | 9.9E+09 | 0.72 | 0.60 | 0.39 |
| 18 | 2810 | 15.1 | -9.1 | 4.0E+10 | 1.11 | 2.78 | 1.56 |
| 4  | 2703 | 21.7 | -7.4 | 2.7.E+10 | 1.63 | 2.93 | 1.58 |
| 19 | 2653 | 41.9 | -4.6 | 1.5E+10 | 1.79 | 2.85 | 1.61 |

Table 2 shows that the larger a content of vanadium is, the further a high-temperature load lifetime is improved, but the further a resistivity ρ is decreased.

NUMERICAL REFERENCES

1 . . . multilayer ceramic capacitor
2 . . . dielectric layer
3 . . . internal electrode layer
4 . . . external electrode
10 . . . capacitor element body

The invention claimed is:

1. A dielectric composition comprising barium titanate, an oxide of yttrium, and an oxide of magnesium, wherein $0.70 \leq \alpha/\beta \leq 0.81$ is satisfied, where a content of the oxide of yttrium is α mol part in terms of $Y_2O_3$, and a content of the oxide of magnesium is β mol part in terms of MgO, and wherein a content of magnesium is 1.12 to 1.85 mol parts in terms of MgO provided that a content of barium titanate is 100 mol parts in terms of $BaTiO_3$.

2. The dielectric composition according to claim 1, wherein a content of vanadium is 0.02 mol parts or more in terms of $V_2O_5$ provided that a content of barium titanate is 100 mol parts in terms of $BaTiO_3$.

3. The dielectric composition according to claim 1, wherein a content of yttrium is 0.78 to 2.03 mol parts in terms of $Y_2O_3$ provided that a content of barium titanate is 100 mol parts in terms of $BaTiO_3$.

4. The dielectric composition according to claim 1, wherein a content of silicon is 1.39 to 2.80 mol parts in terms of $SiO_2$ provided that a content of barium titanate is 100 mol parts in terms of $BaTiO_3$.

5. A multilayer electronic device comprising a dielectric layer, an internal electrode layer, and an external electrode, wherein the dielectric layer is composed of the dielectric composition according to claim 1.

6. The multilayer electronic device according to claim 5, wherein an area ratio occupied by segregated regions of Y on a cross section of the multilayer electronic device is 2.0% or less.

7. The multilayer electronic device according to claim 5, wherein an area ratio occupied by segregated regions of Mg on a cross section of the multilayer electronic device is 2.0% or less.

8. A multilayer electronic device comprising a dielectric layer, an internal electrode layer, and an external electrode, wherein the dielectric composition comprising barium titanate, an oxide of yttrium, and an oxide of magnesium, wherein $0.70 \leq \alpha/\beta \leq 1.10$ is satisfied, where a content of the oxide of yttrium is α mol part in terms of $Y_2O_3$, and a content of the oxide of magnesium is β mol part in terms of MgO, wherein a content of yttrium is 0.78 to 2.03 mol parts in terms of $Y_2O_3$ provided that a content of barium titanate is 100 mol parts in terms of $BaTiO_3$, a content of magnesium is 1.12 to 1.85 mol parts in terms of MgO provided that a content of barium titanate is 100 mol parts in terms of $BaTiO_3$, and wherein an area ratio occupied by segregated regions of Y on a cross section of the multilayer electronic device is 2.0% or less, and an area ratio occupied by segregated regions of Mg on a cross section of the multilayer electronic device is 2.0% or less.

9. The dielectric composition according to claim 8, wherein a content of vanadium is 0.02 mol parts or more in terms of $V_2O_5$ provided that a content of barium titanate is 100 mol parts in terms of $BaTiO_3$.

10. The dielectric composition according to claim 8, wherein a content of silicon is 1.39 to 2.80 mol parts in terms of $SiO_2$ provided that a content of barium titanate is 100 mol parts in terms of $BaTiO_3$.

\* \* \* \* \*